United States Patent [19]

Smith et al.

[11] Patent Number: 4,596,145
[45] Date of Patent: Jun. 24, 1986

[54] ACOUSTIC ORTHOSCOPIC IMAGING SYSTEM

[76] Inventors: Stephen W. Smith, 742 Owens St., Rockville, Md. 20850; Olaf T. von Ramm, 3433 Dover Rd., Durham, N.C. 27707

[21] Appl. No.: 533,956

[22] Filed: Sep. 20, 1983

[51] Int. Cl.$^4$ ............................................. G01N 29/04
[52] U.S. Cl. ......................................... 73/626; 73/607
[58] Field of Search ................. 73/626, 607, 606, 620; 128/660

[56] References Cited

U.S. PATENT DOCUMENTS

| | | | |
|---|---|---|---|
| 4,030,343 | 6/1977 | Lund et al. | 73/626 |
| 4,145,680 | 3/1979 | Smith | 73/626 |
| 4,156,304 | 5/1979 | Lee | 73/626 |
| 4,325,257 | 4/1982 | Kino et al. | 73/626 |
| 4,381,675 | 5/1983 | Roberts et al. | 73/606 |
| 4,412,544 | 11/1983 | Beretsky et al. | 73/620 |
| 4,499,771 | 2/1985 | Roberts et al. | 73/626 |

OTHER PUBLICATIONS

V. R. McCready and C. R. Hill, "A Constant Depth Ultrasonic Scanner", British Journal of Radiology 44, 747-750, 1971.
A. Northved, H. H. Holm, J. K. Kristensen, J. F. Pederson and S. N. Rasmussen, Ultrasound in Medicine and Biology; 1, 183-186, 1974.
T. G. Brown, "Visualization of Soft Tissues in Two and Three Dimensions-Limitations and Development", Ultrasonics, Apr. 1967, 118-124.
D. P. Shattuck, M. D. Weinshenker, S. W. Smith and O. T. von Ramm, "Explososcan: A Parallel Processed Technique for High Speed Ultrasound Imaging with Linear Phased Arrays", Jour Acoust Soc Amer 75(4), 1273-1282, 1984.
P. S. Green, L. F. Schaefer, E. D. Jones and J. R. Suarez, "A New, High Performance Ultrasonic Camera" in Acoustical Holography, vol. 5, P. S. Green, ed. Plenum Press, New York, 1967, 493-503.
P. Maguer, J. F. Gelly, C. Maerfeld, and G. Grall, "An Underwater Focused Acoustic Imaging System", in Acoustical Imaging, vol. 10, Alais and Metherell, eds. Plenum Press, New York, 1982, 607-617.
J. Szilard, "An Improved Three-Dimensional Display System", Ultrasonics, Nov. 1974, 273-276.

*Primary Examiner*—Anthony V. Ciarlante
*Attorney, Agent, or Firm*—Lalos, Keegan & Kaye

[57] ABSTRACT

An acoustic imaging system capable of producing C-mode images or orthoscopic projection images of a three-dimensional volume at significantly increased speeds of operation is described. For each acoustic pulse transmitted by a piezoelectric transducer array an electronic parallel processing system produces several unique image points whose locations in the image correspond to the Cartesian coordinates of the positions of receiving transducers. While range information is not directly displayed, range discrimination can be realized by means of an optional range dependent gain control or an optional color display in which range discrimination occurs through visual discrimination of differing hues.

12 Claims, 8 Drawing Figures

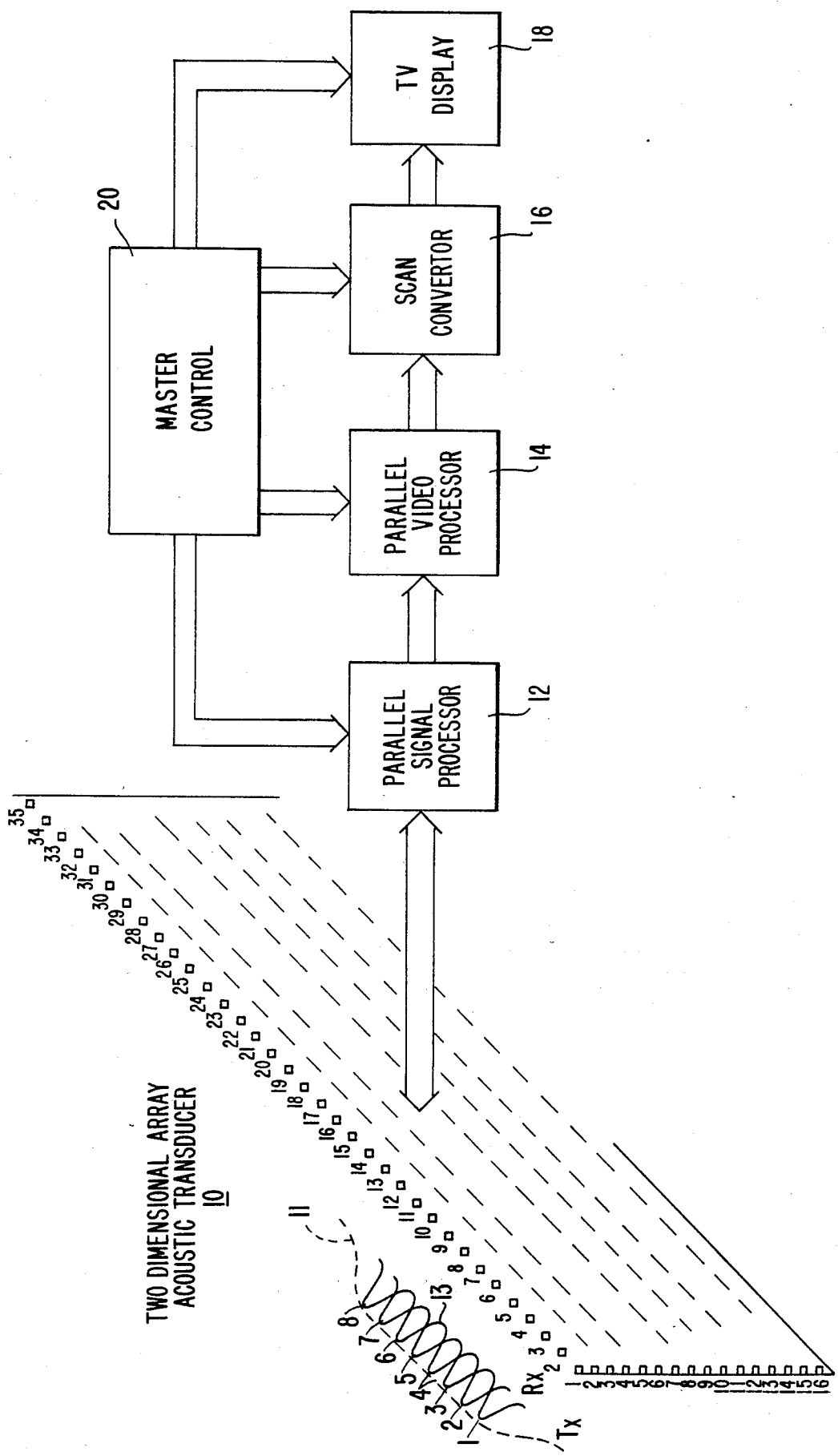

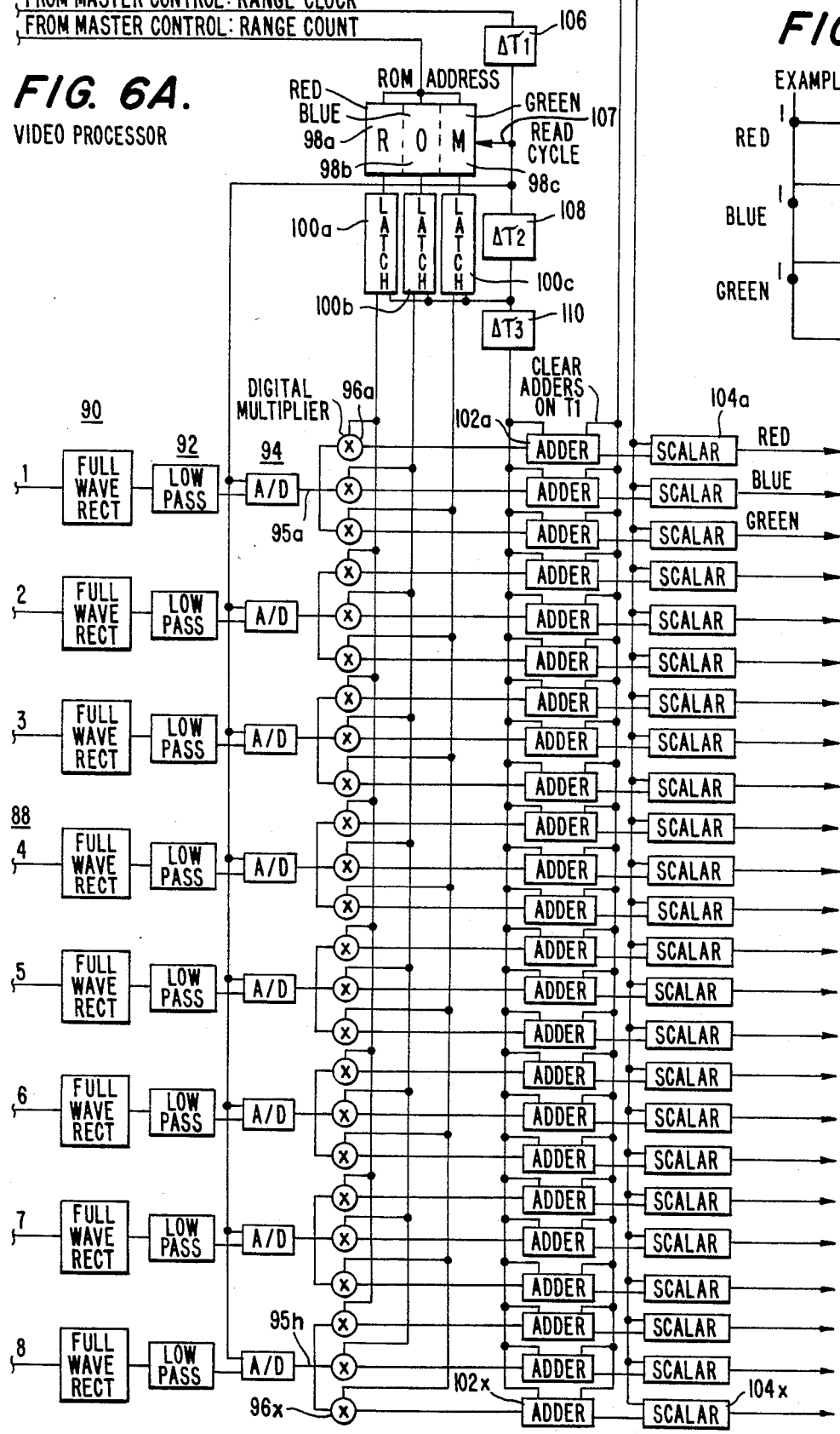
FIG. 6A. VIDEO PROCESSOR
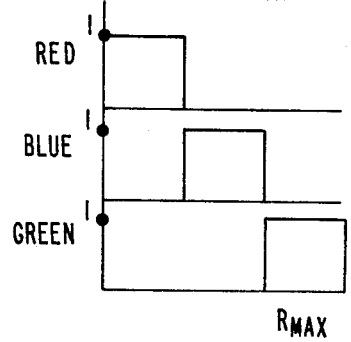
FIG. 6B. EXAMPLE ROM DATA

SCAN CONVERTOR

ACOUSTIC ORTHOSCOPIC IMAGING SYSTEM

BACKGROUND OF THE INVENTION

Acoustic imaging techniques are used in connection with visual inspection or analysis of all of the three phases of materials, i.e., solids, liquids and gases. Examples of applications of such techniques include industrial nondestructive evaluation in metals and liquids, medical ultrasound imaging, underwater imaging and echo ranging in the atmosphere. In the development of such techniques several classes of acoustic imaging systems have been constructed. These various classes of systems obtained display data in one, two or three dimensions. The various types of imaging devices include direct imaging systems such as acoustic cameras or pulse-echo devices and indirect reconstructed imaging devices including acoustical holographic devices, synthetic aperture and computed tomographic systems.

Acoustic imaging devices perform two basic tasks: data acquisition and data display. As stated, there are a variety of techniques by which these two functions are realized.

The most important one-dimensional imaging technique is referred to as pulse-echo A-mode in which a piezoelectric transducer transmits a short burst of acoustic energy into a medium and then receives and displays the amplitudes of echoes as a function of the echo range, i.e. the time of flight.

The most important two-dimensional acoustic imaging technique is pulse-echo B-mode tomography in which echoes returning to the transducer are displayed as brightness levels proportional to echo amplitude. The transducer is mechanically or electronically translated or steered in one-dimension. In the display the brightness levels are displayed with reference to echo range and transducer position or orientation providing cross-sectional images of the object.

Reference can be made to FIG. 1 of the drawings which will be used in describing the various prior art imaging techniques. This drawing includes a one-dimensional transducer array E-F which can produce a B-mode scan E-F-W-V of the object volume. B-mode images are comprised of many B-mode lines obtained at the rate of one B-mode line per transmitted acoustic pulse. The maximum B-mode line rate is given by:

$$R_{(lines/sec.)} = v/2z$$

Where v is the acoustic propagation velocity and z is the maximum range of the image. Recent developments in this field have included parallel signal processing techniques which enable one to obtain and display several B-mode image lines per acoustic pulse.

A third important class of acoustic imaging systems in the prior art is the orthoscopic projection imaging system. Devices in this class include C-mode pulse-echo scanners, acoustic three-dimensional scanning systems, transmission or reflection acoustic cameras and acoustic holographic imaging systems. In these devices a three-dimensional volume of the object is interrogated by acoustic radiation via floodlight insonification or beam formed pulses. Data from the volume can be processed and displayed in several different ways.

For C-mode imaging systems a single transducer or array operates in the pulse-echo mode. The transducers are physically or electronically scanned through a rectangular raster format so that a three-dimensional volume of the object is interrogated by the ultrasonic beam, or the front surface of the transducer is fixed at a single point and the body of the transducer is moved in a spiral motion so that the transducer insonifies a conical three-dimensional volume in a spiral format. In each case only echo data from a preselected range is displayed as brightness levels proportional to echo amplitude. Due to the use of a fixed focus lens and an electronic range gate, a C-scanner presents two-dimensional data in an orthoscopic display in which the display coordinates are the x, y cartesian coordinates of the targets at a fixed depth in the object.

For example, referring to the diagram in FIG. 1 a single element of the two-dimensional transducer array A-B-C-D is fired and receives echoes from one line of the three-dimensional volume. Only those echoes which are located in a predetermined range gate are displayed in a single image point. After each element of the array has been fired subsequently, the complete C-mode image will be obtained, for example, in the plane R-S-T-U. Due to the fact that the display does not include target range, but includes directions perpendicular to target range, C-mode systems operate so that each point in the image requires a transmitted acoustic pulse. Thus, the time necessary to develop a complete C-mode image is significantly longer than the image formation time for a B-mode image, and an N×M point C scan requires N×M transmitted ultrasound pulses.

The prior art includes pulse-echo scanned three-dimensional imaging systems. One such system causes a transducer to be scanned in a raster format insonifying a three-dimensional rectangular parallelopiped. Cartesian coordinates are used in the display in a complicated manner which allows an orthographic display of a three-dimensional object in different projections, but without image perspective. Again referring to FIG. 1, the three-dimensional volume using this system is interrogated as in the case of the C-scan, but in this case the echoes from the entire volume are displayed as a function of the x,y coordinates so that parallel object planes in the z direction overlap in the images.

Another prior art system utilizes a three-dimensional scanner in which a conical volume is insonified by a combination of sector steering plus rotation. Again in this system Cartesian coordinates are used in the display, although it is claimed that some perspective view is obtained by modulating the size of the x,y display with the third Cartesian coordinate z.

In each of the types of three-dimensional scanning systems a line of pulse-echo data along one transducer orientation is displayed as a single point in the image. Accordingly, the time required to form the complete three-dimensional image is identical to the time required to develop a C-mode image. This amount of time is significantly greater than that required for the formation of a B-mode image. Therefore while these systems produce a greater amount of information the time required for the production of that information is similarly greatly increased.

It is therefore an object of this invention to provide an improved orthoscopic projection acoustic imaging system wherein an image of a three-dimensional volume having a greater amount of information can be realized in a much shorter time than with prior art techniques and wherein the acquisition and processing of acquired data occurs at a much faster rate.

Another object of this invention is to provide an improved acoustic imaging system of the foregoing type which utilizes the C-mode pulse-echo technique, but which uses parallel processing units to produce more than one image pixel for a transmitted acoustic pulse.

A further object of this invention is to provide a system of the foregoing type capable of producing the results described immediately above, but which is capable of operating using two dimensional transducer arrays or a one dimensional linear transducer array along with a mechanical displacement device.

Still another object of this invention is to produce an acoustic imaging of the foregoing type which provides range discrimination of targets and which incorporates colored coding to indicate range or amplitude weighting to enhance range discrimination.

SUMMARY OF THE INVENTION

The foregoing and other objects are obtained in an improved acoustic pulse-echo imaging system capable of producing orthoscopic images using a C-mode format or an orthoscopic projection display of a three-dimensional volume, which system operates at significantly higher speeds than have been available in prior art systems. In accordance with the invention the pulse-echo imaging system can use an acoustic transducer or transducers or a combination of an acoustic mirror and transducers to produce either a directed transmit pulse and many similarly directed receive orientations or a nondirected transmit pulse (floodlight insonification) and many directed receive orientations. For each transmit pulse a parallel processing system constructed in accordance with the principles of the invention produces several unique image points whose locations in the image correspond to the Cartesian coordinates of the receive transducer positions or directions. The data processing provided by the parallel processing systems, however, provides no display of range information.

Alternatively, in accordance with the invention range discrimination can be provided through the use of a range dependent gain control or through the provision of a color display in which data originating from different range points is displayed in different hues or through some other range indicating color or brightness shading variation. Echo data varying in signal amplitude from a given range may be displayed in varying intensities of the corresponding hue. Should the object being viewed contain overlapping structures, this arrangement in accordance with the invention will eliminate overlapping effects in the image being displayed.

BRIEF DESCRIPTION OF THE DRAWINGS

The principles of the invention will be more readily understood by reference to the description given hereinbelow of a preferred embodiment of the invention constructed according to those principles and by reference to the drawings which are described briefly as follows.

FIG. 2 is a block-schematic diagram of a preferred embodiment of a system constructed according to the principles of the invention.

FIG. 6a is a detailed schematic diagram of the video processor portion of the FIG. 2 system.

FIG. 6b is a diagram illustrating an example of the coding of the read only memory contents in the circuit illustrated in FIG. 6a.

DETAILED DESCRIPTION OF THE PREFERRED EMBODIMENT

Figure 1:
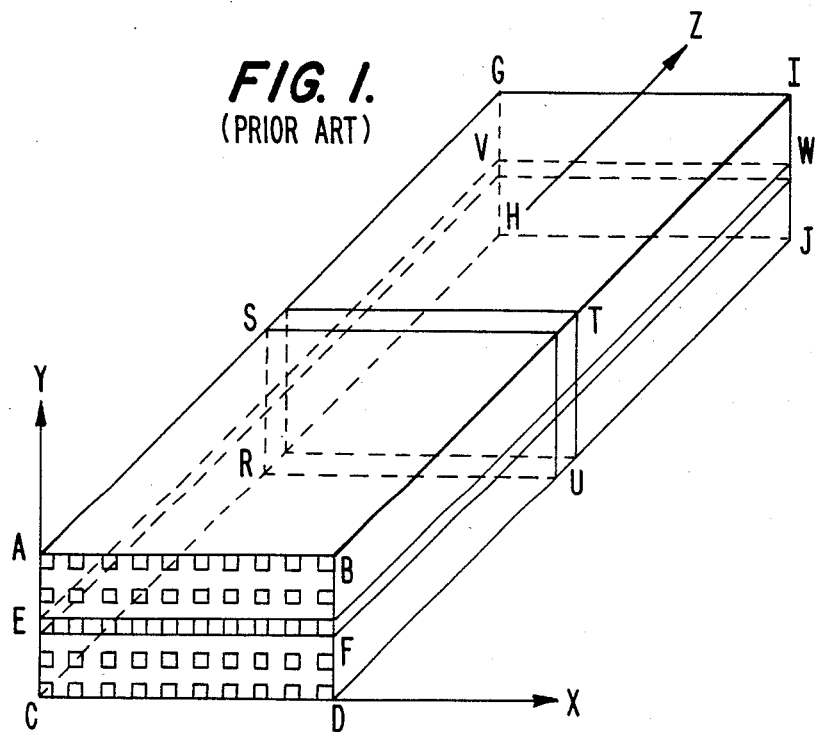
FIG. 1 is a diagram used in conjunction with the description of the prior art given hereinabove.

In FIG. 2 is illustrated a block-schematic diagram of an acoustic imaging system constructed according to the invention which includes a two-dimensional array acoustic transducer 10, a parallel signal processor 12, a parallel video processor 14, a scan converter 16, a television type display 18, and master control 20. The latter components are connected to produce the illustrated signal paths. Each of the various functional units identified above will be described in greater detail hereinbelow.

In this exemplary description the transducer array 10 includes rows of 35 elements and columns of 16 elements; only the first row and column are specifically illustrated in FIG. 2. Thus, in accordance with the invention the illustrated system produces a 32×16 pixel C scan or projection image of a three-dimensional volume assuming the use of 8:1 parallel processing.

In the illustrated system the master control 20 regulates the functions of each of the other portions of the system. During normal operation scan converter 16 is generally in a Read mode so that acoustic information stored in its memory is being displayed. Whenever all acoustic information from one transmit burst has been received, and the television system begins a horizontal retrace interval, the scan conversion memory is updated with new acoustic information. In this exemplary embodiment, the displayed image frame rate is always 30 frames per second regardless of the acoustic acquisition times. At the completion of data transfer to the memory of scan converter 16 a new group of transmit and receive elements are selected, and a new acoustic burst is transmitted. Simultaneously, the video system is placed in the Read mode so that at the end of the horizontal synchronization period the scan converter memory can again be read and the most current acoustic image displayed.

As pointed out hereinabove, in this preferred embodiment parallel processing is used to obtain acoustic data from eight directions simultaneously. Unlike B-mode or A-mode systems acoustic information is integrated over the entire target range for each receive operation. Thus, at the end of a reception period one number stored in video processor 14 represents the acoustic information obtained from one direction. The echo range information typical in B-mode or A-mode systems would have been lost. In utilizing the color processing aspect of video processor 14, which will be described below, range discrimination can occur. During an operating sequence groups of eleven elements are used for transmitting and receiving. Thus, four transmit bursts are required to obtain all of the information for each row of the 35×16 array; and 64 pulses are required for the final 32×16 pixel image.

Figure 3:
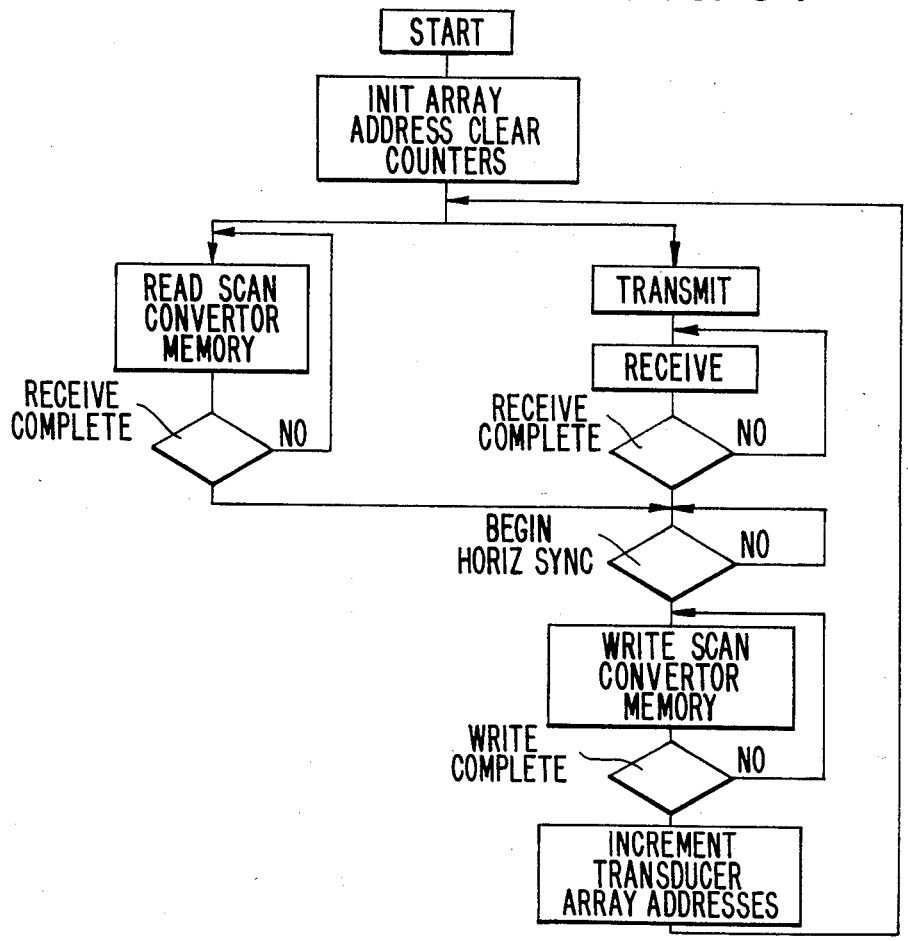
FIG. 3 is a flow chart describing the sequence of operation of the FIG. 2 system.

Referring to FIG. 3 there is shown a flow chart which describes the operation of the preferred embodiment as it is directed by the master control. Upon reception of a start command, the array addresses of the two-dimensional transducer array 10, the appropriate memory addresses in scan converter 16, and the needed counters in master control 20 are initialized. Transmit pulses then activate the appropriate group of elements of transducer array 10. These elements subsequently receive the acoustic echoes from targets in the object volume until echoes from a predetermined maximum range have arrived at which time a Receive Complete signal terminates the receive mode. In a parallel or simultaneous operation, during the transmit and receive mode, a portion of the memory in scan converter 16 which stores the image data in digital form is read sending previous image data to the display monitor. After Receive Complete is noted and with the initiation of the next horizontal synchronization pulse for the television display 18, all the new echo data (multiple image pixels from a single transmit pulse) are written into the proper locations of the scan converter memory. A Write Complete signal is received, the transducer and memory array location are incremented, and the entire cycle is repeated.

Figure 4:
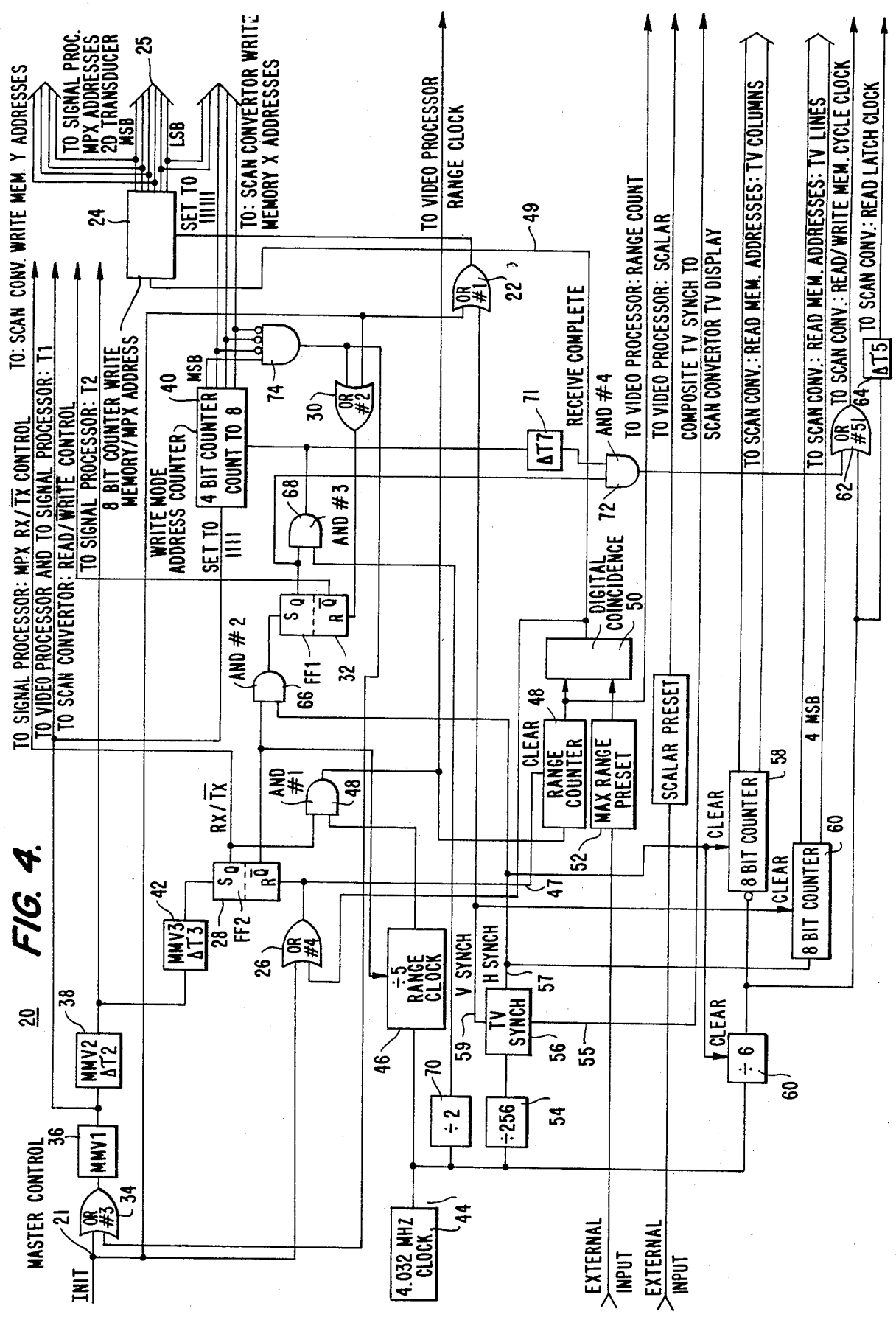
FIG. 4 is a detailed schematic diagram of the master control portion of FIG. 2 system.

FIG. 4 illustrates in detail the construction and operation of master control 20. An initiate signal (INIT) which can be from any source including a switch closure appears at terminal 21 and commences operation of the system by initiating several functions in the master control. An Or gate 22 is enabled by the initiate signal, and it produces an output which initializes six bit counter 24; the counter is in this example set to all ones. The counter output is transmitted via bus 25 to signal processor 12 to determine the first group of transducer array elements which will be used to transmit and receive the acoustic signals. The two least significant bits of counter 24 are also sent to scan converter 16 as part of a Write mode memory column address. The four most significant bits from the counter are also sent to scan converter 16 as the Write mode memory row address.

At the same time, the initiate signal appearing at terminal 21 enables Or gate 26, the output of which resets a flip-flop 28 so that the set output from this unit indicates that the master control is in the transmit configuration. This signal is also sent to signal processor 12. Or gate 30 is concurrently enabled, and the output from this unit resets a flip-flop 32. The reset output from the latter unit is applied to scan converter 16 as a Read/Write control bit whereby the scan converter is placed in the Read mode so that the stored image data can be sent to the display monitor. Or gate 34 is similarly enabled by the initate signal appearing at terminal 21 and it in turn triggers a monostable multi-vibrator 36. The output from the latter unit is coupled to signal processor 12 and video processor 14 as a trigger signal. The output from multi-vibrator 36 also triggers a second monostable multi-vibrator 38 which introduces a predetermined delay, and the output from the latter is also supplied to signal processor 12. The output signals from multi-vibrators 36 and 38 are in effect the transmit timing pulses which trigger the transmitters 80a through 80k of signal processor 12. The output from multi-vibrator 36 also initializes a four bit Write mode address counter 40 by setting it, in this example, to ones.

Concurrently the output from multi-vibrator 38 triggers another monostable multi-vibrator 42 which in turn introduces a short delay. The output from multi-vibrator 42 sets flip-flop 28, the set output from which forms the Receive/Transmit control bit for the multiplexers of signal processor 12. Thus after the transmit trigger pulses from multi-vibrators 36 and 38 the system switches from the transmit mode to the receive mode.

The operation of the entire system is timed by a 4.032 Mhz quartz clock 44. The output from the clock is supplied to a divider 46 which divides by a factor of five and produces timing pulses at a rate of 0.806 Mhz or 1 pulse every 1.240 microsecond. Under normal circumstances the rate of arrival of acoustic echoes in a pulse-echo imaging system for a water-like medium is one millimeter of echo data every 1.33 microsecond. Thus the divider 46 can serve as a measure of echo range with a known inaccuracy of less than +7%. It should be noted that other clock frequencies can be selected and proper selection would reduce this inaccuracy.

Range counter 49 is driven from divider 46 through And gate 48. The initiate signal appearing at terminal 21 enables Or gate 26, and the output from Or gate 26, transmitted via line 47, operates to clear range counter 49. The output of Or gate 26 also resets flip-flop 28, the reset output from which clears the divider 46 so that it begins counting at the initate signal which also is coincident with the acoustic transmission.

The set output from flip-flop 28 is also an input to And gate 48 as is the output from divider 46. The output from And gate 48 is supplied at an input terminal at range counter 49 which counts the target range in millimeters as discussed above. The output of the range counter, referred to as a range count, is supplied to video processor 14 along with a scaler preset parameter which is an inverse function of the maximum image range supplied by an external input.

The output from range counter 49 is also supplied as an input to digital coincidence circuit 50. The second input to the digital coincidence circuit is the value of the maximum desired image range, which may be a preset value obtained from an external source such as a thumbwheel switch 52. When the output from range counter 49 matches the value of the maximum range preset 52, the digital coincidence circuit 50 sets the bit for Receive Complete. The Receive Complete bit increments six bit counter 24 so that the new transducer array element multiplexer addresses are chosen for the next acoustic transmission period in the sequence, and the X-Y scan converter addresses are chosen for the Write memory process. The Receive Complete signal appearing on line 49 also enables Or gate 26 for purposes of clearing range counter 49 and divider 46 for the next transmitted acoustic pulse.

With reference again to the flow chart in FIG. 3 the scan converter memory operation proceeds in parallel with the acoustic transmit/receive operation. A second divider 54 receives the output from clock 44 and divides this frequency by a factor of 256. Thus, the clock rate is effectively reduced to 15.75 Khz. rate which is the standard rate for television synchronization. This signal is used to time the operation of a television synchronization generator 56, the outputs from which include horizontal synchronization pulses 57 and vertical synchronization pulses 59. Further, composite synchronization pulses are produced on line 55 to be coupled to the television monitor 18. The horizontal synchronization pulses appearing on line 57 act as clear signals for a five bit counter 58, the operations of which are times by the inverted output from divider 60 which divides the clock output by a factor of six. Counter 58 increments Read memory addresses in scan converter 16 corresponding to the individual pixels (television columns) along a given raster line. In this example there are 32 pixels per horizontal t.v. line. The vertical synchronization pulses appearing on line 59 clear an eight bit counter 60, the operations of which are timed from the horizontal synchronization output 57. The four most significant bit outputs from counter 60 operate to increment Read memory addresses in scan converter 16 corresponding to the 16 t.v. lines in the field of display. Divider 60 also cycles the memory in scan converter 16 during the Read process via Or gate 62 after the Read memory addresses have been incremented. The enable signal to Or gate 62 is also supplied to a delay circuit 64 for predetermined delay transmission for cycling a Read latch (to be described) in scan converter 16.

Referring again to the flow chart in FIG. 3 it will be seen that the Receive Complete signal ends the Read scan converter memory process during which some portion of the image data will have been sent to the display monitor. The magnitude of the portion of image data so sent depends on the maximum image range. After the Receive Complete trigger, the system awaits the beginning of the next horizontal synchronization pulse at which time the Write scan converter memory process begins to write the newly acquired echo data (in this example 8 pixels) into the scan converter 16.

The foregoing process is controlled in master control 20 in the following manner. The Receive Complete trigger is an input to Or gate 26 which resets flip-flop 28, the reset output of which is an input to And gate 66 along with the horizontal synchronization pulses appearing on line 57. The output from And gate 66 sets flip-flop 32 which operates to switch the scan converter Read/Write control bit to Write ending the Read memory operation. The set output of flip-flop 32 is an input to And gate 68 along with the output from another divider 70 which operates to divide the output from clock 44 by a factor of 2. The output from And gate 68 increments counter 40, the three least significant bits of which are supplied as the three least significant bits of the Write memory in scan converter 16. In addition the set output from flip-flop 32 and the output from And gate 68, which is delayed in circuit 71 are the inputs of And gate 72. When the latter And gate is enabled it in turn enables Or gate 62. The output from Or gate 62 forms the Read/Write memory cycle clock. Thus, during the Write process the scan converter memory is cycled at a rate of 2.016 Mhz, and the eight data points are written into scan converter 16 in approximately four microseconds. The most significant bit of counter 40 enables a four input And gate 74, the output from which enables Or gate 30. As previously, the output from the latter Or gate resets flip-flop 32 switching it back to the Read mode. The output from And gate 74 also reinitiates master control 20 beginning the process for the next cycle of transmission and reception.

In this specific example the 32×16 display for a total of 512 pixels in a single image frame are obtained with a total of 64 acoustic pulses. The latter can be accomplished through the use of an 8:1 parallel processing arrangement as will be described in the following. After the 64th pulse, the vertical synchronization signal reinitializes counter 24 for the next image field.

Figure 5:
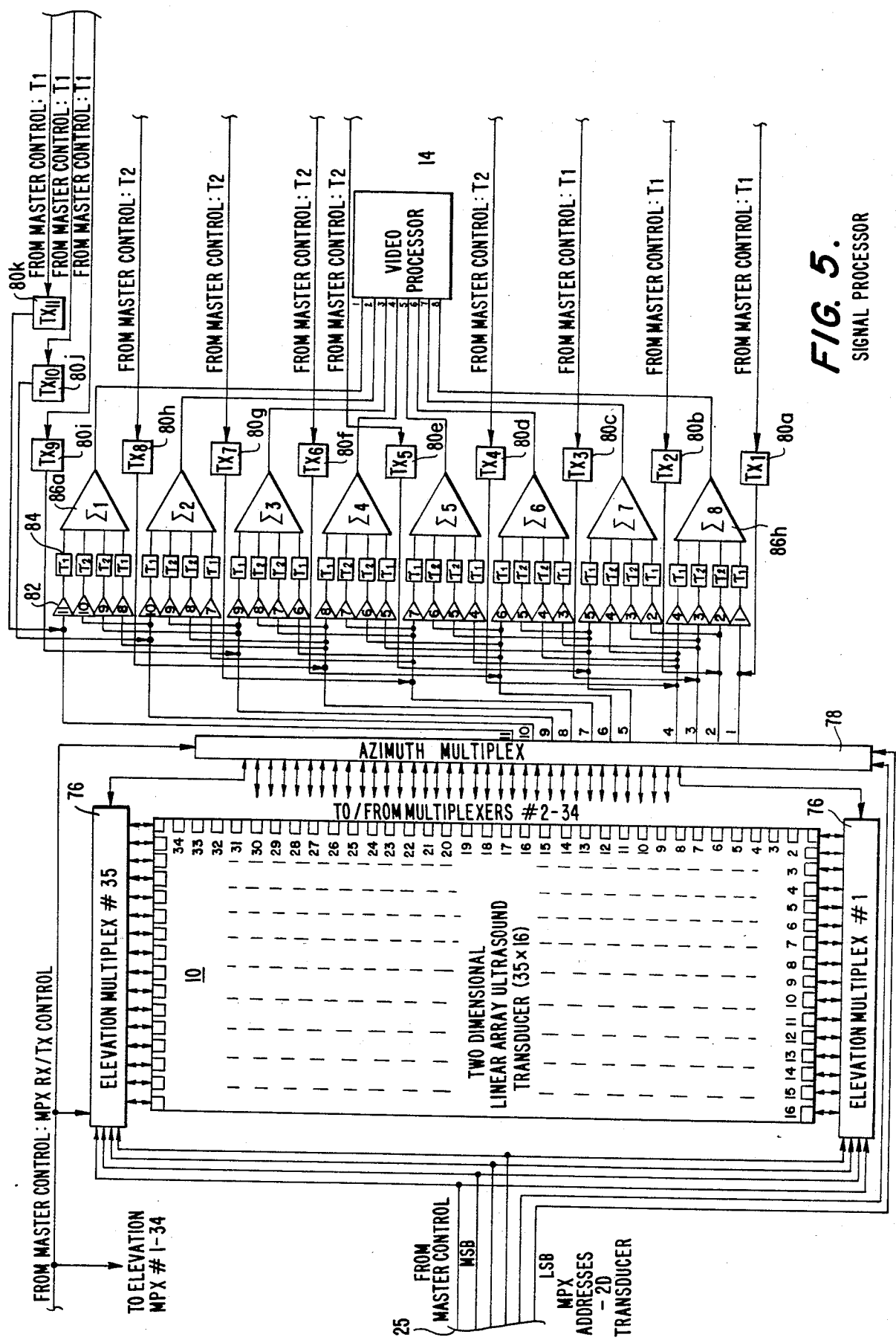
FIG. 5 is a detailed schematic diagram of the parallel signal processor portion of the FIG. 2 system.

The construction and operation of parallel signal processor 12 are described in detail in conjunction with FIG. 5. In this figure the two-dimensional transducer array 10 is rearranged for being more easily viewed. The longer dimension of the array, which is the azimuthal dimension, is shown as 35 rows of elements, and the elevational dimension is shown as 16 columns of elements. The elements of each row are connected to one side of a 16:1 bi-directional elevation multiplexer 76. There are in this example a total of 35 elevation multiplexers in parallel which act to choose which of the 16 columns of 35 azimuthal elements are used during an individual pulse-echo process. The four most significant bits of the address lines 25 for the elevational multiplexers arrive from a master control 20 in parallel. The active elements from the elevation multiplexers are connected to the bi-directional 35:11 azimuthal multiplexer 78. Two bit address lines from master control 20 to azimuthal multiplexer 78 determine which of the four possible groups of eleven elements of the 35 are active. The initiate signals applied to master control 20 at terminal 21 reset the receive-transmit bit to transmit. This signal is sent to the azimuth multiplexer 78 and the 35 elevation multiplexers 76 to enable signals to pass from the transmitters to the transducer array elements.

The transmit timing pulses from monostable multi-vibrators 36 and 38 are sent to the transmitters 80a–k from the master control. As shown in simplified form in FIG. 5, the trigger pulse from multi-vibrator 36 is applied to transmitters 80a–c and 80i–k, and the trigger pulse from multi-vibrator 38 triggers transmitters 80d–h. When triggered in the foregoing manner, these transmitters generate transmit pulses which are sent to the specifically addressed transducer elements. Each transducer element emits an accoustic pulse so that a composite accoustic pulse is propagated directly ahead into the target volume and is focused at some predetermined range depending on the time relationship between the two trigger pulses from multi-vibrators 36 and 38. For example, the focal range may correspond to the range of the C-scan plane. A possible directivity pattern of the transmitted accoustic pulse in the azimuthal dimension is shown by the dash curve 11 in FIG. 2. Alternatively, the transmitted pulse may be a plane or diverging wave front which uniformly insonifies the target volume for use in imaging the entire three-dimensional volume. It should be noted that additional timing pulses may be generated in the master control by the use of more monostable multi-vibrators in addition to multi-vibrators 36 and 38 to obtain more complex focusing in the transmit mode.

Immediately following a transmitted pulse the direction of all the multiplexers are switched to a Receive mode. As discussed above, this is accomplished using the receive/transmit control bit from the master control.

In the Receive mode echoes from the target volume return to transducer array 10 and pass from the original transmitting group of eleven elements through the multiplexers 76 and 78 and are routed to 32 receive amplifiers 82 where they are amplified and time gain compensated as necessary to compensate for attenuation with range. If desired, non-linear amplification techniques can be implemented in each receiver. The outputs from each receiver are, respectively, routed to one of the time delay lines 84 which provide an effect of Receive mode focusing. The echo signals, so delayed, are then applied in groups of four adjacent elements to, respectively, one of eight summing amplifiers 86a–h. Thus, each group of four adjacent elements within the original transmit group acts as one receive channel so that for the first transmit pulse each of the four groups arranged as in FIG. 5 operate as eight parallel Receive mode channels. The eight parallel channel outputs from summing amplifiers 86*a–h* are applied as inputs to parallel video processor 14.

To achieve receive mode focusing, the signals from two inner elements in each channel are delayed slightly with respect to the two outer elements in that channel. For example, in the first channel including summing amplifier 86*a* the inner elements 82-9 and 82-10 are delayed slightly with respect to the outer elements 82-8 and 82-11. These delays are predetermined in such a way that echo signals originating from a target at the range in question will emerge from the four delay lines in a time synchronous fashion so that the four signals from the desired range are added at summing amplifier 86*a*. The operation of the delay lines 84 then achieves an electronic focus in the Receive mode totally analogous to an acoustic lens.

It will be noted that in the foregoing example two fixed delays were chosen and these were to be the same for each channel. Such an arrangement would achieve a receive focusing effect at a single fixed range. However, variable delays can readily be used and altered in any desired manner so that the focal point of the electronic lens tracks with the range of origin of the arriving echoes. A dynamic focusing effect is then achieved so that all ranges in the target volume are in focus in the Receive mode. A dynamic focusing capability is important for an image of the entire three-dimensional target volume. The delays may be either analog or digital. If digital delays are used analog to digital conversion must be incorporated after receive amplifiers 82. Alternatively for far-field imaging no delay lines are required.

Referring back to FIG. 2 the Receive mode directivity functions from the eight parallel channels are shown at the focal range as solid curves 13 superimposed on the single transmit directivity pattern in that figure. The product of the transmit response and an individual four element receive directivity pattern form the imaging system response function for that particular channel producing a single point in the image.

After the echoes from the maximum range in the target volume return to the transducer, the Received Complete signal in the master control resets the transmit bit and the multiplexers return to the transmit mode. Likewise, the selected address of the azimuth multiplexer is incremented for the next group of transmit-receive transducer elements. This sequence is repeated twice more in the first row of the transducer array so that all 35 elements are used to produce 32 points in the acoustic image from four transmit pulses. The same process is then repeated for the second row through the sixteenth row of transducer array 10. The final result is that a total of 512 image points have been obtained with only 64 transmit pulses in one-eighth the time necessary to produce a C scan or a three-dimensional image using systems described hereinabove and in the prior art.

As alternatives, it is anticipated that the design of system in accordance with the invention can be extended to any two-dimensional transducer array in which groups of transducer elements are combined in the Receive mode to produce a predetermined number of image points. Moreover, the degree of parallel processing can be increased or decreased. The maximum extension of the principles of the invention will result in all Receive mode channels being constructed in parallel and thus an entire projection image can be obtained with a single transmitted acoustic pulse.

FIG. 6 illustrates in detail the construction and operation of video processor 14. It should be pointed out that with the exception to be discussed below this unit is constructed to perform the conventional functions attributed to video processing circuits in such prior art systems as acoustic single video channel pulse echo systems. Basically the input echo data undergoes full wave rectification followed by low pass filtering. These two operations result in the equivalent of envelope detection before the echo data passes to the display or to scan converter 16 through an analog to digital converter.

In accordance with the invention an important feature of video processor 14 is the optional range discrimination capability using color encoding and/or amplitude weighting with range which will be discussed hereinbelow.

The input lines 88 to the video processor are, as previously discussed, individually connected to outputs of the summing circuits 86. In the conventional manner the echo data are full wave rectified in each of the full wave rectifiers 90, one of which is connected to each of the input lines 88. The rectified signals are then applied to low pass filters 92 to obtain frequency ranges suitable for video Z axis data. The filtered signals then undergo analog to digital conversion in the respective converters 94. Converters 94 are driven at a rate determined by the master control clock as previously discussed, in this example the converters are driven at a rate of 0.806 Mhz or the equivalent to one sample per millimeter of range. In this example, the conversion resolution is six bits. The outputs from each of the converters 94 are, respectively, at junction points 95*a–h* divided into three parallel channels for color encoding purposes, i.e. one channel for each primary color to be used. Each of the foregoing channels forms one input to a respective one of 24 digital multipliers 96*a–x* so that 24 parallel channels are now formed.

The color data for each of the colors red, blue and green are contained in Read only memories 98*a–c*. The outputs of each of these memories are applied as inputs to each of the digital multipliers 96*a–x*, the other input to each multiplier being the output from its respective analog to digital converter 94 as illustrated in this figure.

The color encoding scheme is shown in FIG. 6*b*. In this figure the maximum image range is divided into three equal segments, one for each primary color. In the first segment the red data has an amplitude of 1, while the blue and green data are 0. The second segment shows the blue data to have an amplitude of 1 while the amplitudes of red and green are 0. In the third segment the amplitude of the green data is 1 while red and blue are 0.

In each Read only memory 98*a–c* the number of color data words equals the maximum range preset value in the digital coincidence counter 50 in the master control. Color data addressing in the parallel Read only memory is provided by a range count value from the master control. The memories are cycled in parallel with each count of the range clock. As the three Read only memories are read, the outputs are fed to three parallel digital latches 100*a–c*. As indicated, each latch receives its input from a separate one of the Read only memories. The outputs from the three latches form the second input to the 24 digital multipliers 96. Thus, for each of the eight parallel channels the data is multiplied in three parallel operations by the red, blue and green color coding data.

The results of each multiplication operation or the outputs from each digital multiplier 96 are applied, respectively, to an input of one of the 24 adder circuits 102a–x cleared by monostable multivibrator 36 of master control 20. This has the effect of integrating the echo data over the preset maximum range. The output from each adder is a single digit value corresponding to the integral of the echo data over the image range weighted by the color coding.

Each adder output is supplied as an input to a respective one of the scalers 104a–x. The scaler value is received as one input to each scaler unit from the master control. The scaler value was discussed in connection with the discussion of FIG. 4. The outputs from the 24 digital scalers 104 are divided into three groups of eight, each group corresponding to one of the three colors red, green or blue. These form input pixel data to scan converter 16.

A delay circuit 106 is inserted between the range clock output and the Read cycle input 107 of the Read only memories. The amount of delay inserted allows for echo data flow up to and through the analog to digital converters 94. Delay circuit 108 is inserted between the Read only memories 98 and latches 100 so that the range address of the color coding is identical to the range of origin of the echo data at the digital multipliers. Delay circuit 110 is inserted to allow adder operation to coincide with data flow through the multipliers discussed above.

It was previously mentioned that the invention contemplates range discrimination occurring additionally through the use of amplitude weighting. If this option should be elected, exclusive of color coding with range, all digital processing downstream of low pass filters 92 would be eliminated, and this circuitry would be replaced by parallel analog multipliers with one input from each of the eight echo data lines. A second input would be formed by a range weighting device, such as a range gate which is used in connection with conventional C-mode scanning. The range weighted outputs of the multipliers could then be multiplexed to the Z axis drive of an electrostatic display monitor (not shown). Additional alternatives include digital multiplication and/or digital scan conversion or optical scan conversion.

An alternative display technique is the threshold display. It would involve the use of an echo threshold detector such that if an echo in a preselected range interval exceeds a threshold level, further input to the integrators in video processor 14 is disabled so that only the echo exceeding the threshold is displayed. A variation of this technique is first surface detection.

Figure 7:
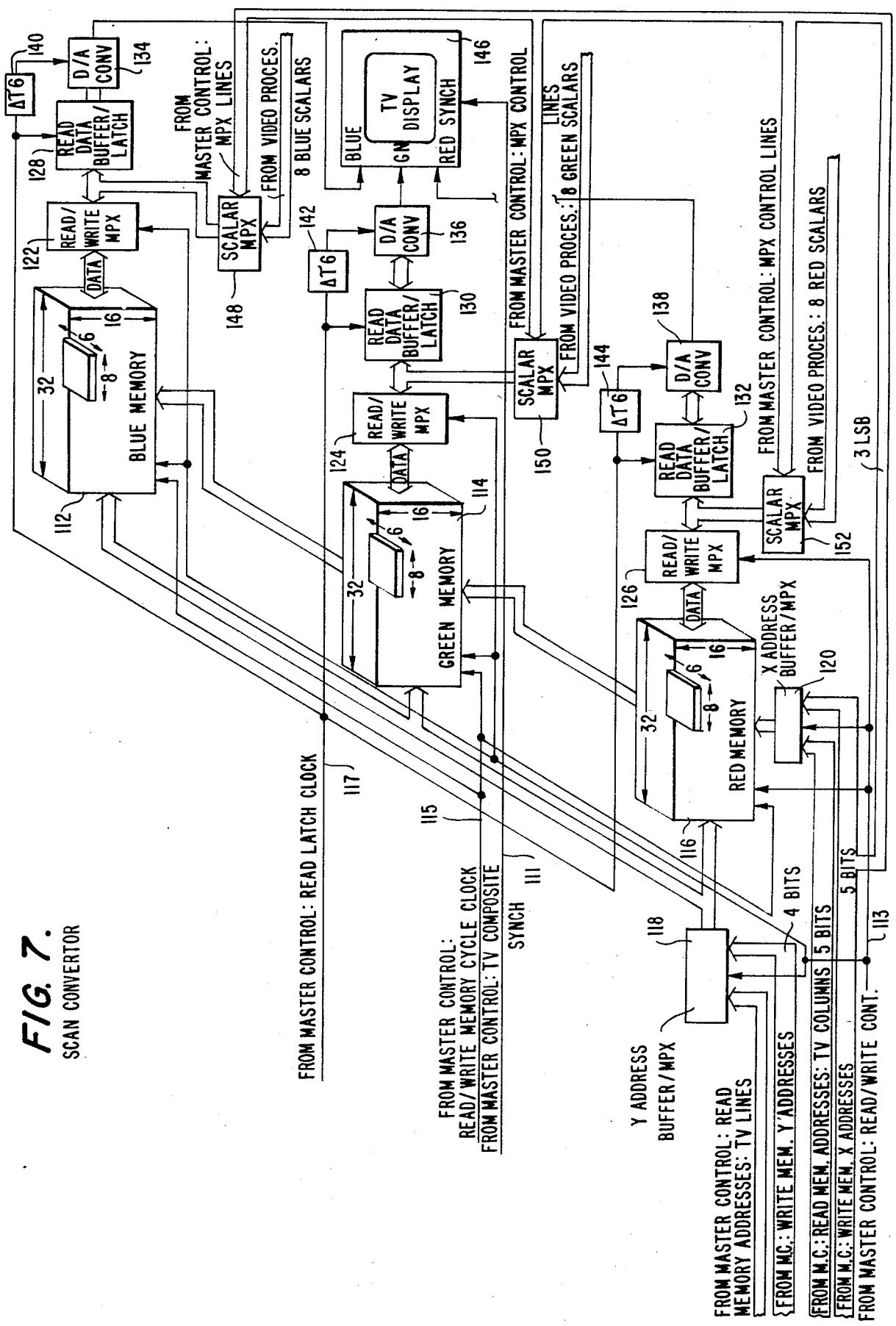
FIG. 7 is a detailed schematic diagram of the scan converter portion of the FIG. 2 system.

FIG. 7 is a detailed schematic diagram of scan converter 16. The scan converter portion of the described system enables the color display of the image data in a television format. Scan converter 16 includes three parallel digital memories 112, 114 and 116 which correspond, respectively, with the three primary display colors blue, green and red. These memories store the image data until such data is to be read out for display purposes. It will be noted that the data are read into each memory eight pixels at a time.

In order to properly understand the scan conversion process it will be necessary to refer to the discussion of the master control in connection with FIG. 4 along with the following description. It will be remembered that in the master control a vertical sync pulse is produced at a 60 Hz. This pulse clears two counters which determine the Read memory X and Y addresses of scan converter 16. Following the next Write memory operation the master control sets the Read/e,ovs/Write/ control bit to Read. This bit is routed to several destinations in the scan converter as illustrated. This signal which appears on line 113 switches a Y address buffer/multiplex circuit 118 and an X address buffer/multiplex circuit 120. When so switched, these buffers will accept Read memory addresses from the master control and supply the Read addresses to the scan converter memory. Each of the memories 112–116 receive the same bit to allow them to be switched to the Read mode. The Read bit is sent in parallel to the Read/Write multiplexer of each memory; these are identified respectively as elements 122, 124 and 126. Application of the Read bit to these multiplexers allows the image data to pass from the respective memories to, respectively, to Read data buffer latches 128, 130 and 132.

When the Read control bit has been received, the Y address buffer multiplex 118 passes a four bit data address (0000) in parallel to the memories 112, 114 and 116. This forms the first t.v. line location of the pixel data. Simultaneously X-address buffer multiplex 120 passes a five bit data address in parallel (0000) to the three memories, which forms the column location of the first pixel. A first 0.672 Mhz clock pulse from the master control appearing on line 115 cycles memories 112–116, and the first address data value moves in parallel from the memories through the Read/Write multiplexers to the three Read data buffer/latches. A delayed Read latch clock signal, which passes through delay circuit 64 in the master control appears on line 117 causing latches 128–132 to be cycled in parallel, and the data point moves from the latches to the three digital to analog converters 134, 136 and 138. The respective delay circuits 140, 142 and 144 introduce a further predetermined delay in the transmission of latch clock pulses from line 117 to the respective digital to analog converters. The outputs of digital to analog converters 134–138 are applied, respectively, to the appropriate color inputs of a television display device 146. In the conventional manner the display device receives the composite, horizontal and vertical synchronization signals on line 111 developed as discussed in connection with FIG. 4 from the master control.

The entire operation of Read and display from the entire contents of the scan converter memory 112–116, using the parameters set forth herein is completed in one-sixtieth of a second. Thus, only some large fraction of the entire memory Read process is completed during the transmit/receive period of a single acoustic pulse depending on the maximum range of the image. The Read mode of the scan converter is ended at the initiation of the first horizontal synchronization pulse after the Receive Complete bit has been set in the master control for every transmitted acoustic pulse.

In the Write mode the address buffer/multiplex circuit 118 and 120 are switched to pass Write memory addresses. The memories are switched from a Read to a Write mode. In this mode the Read/Write multiplex circuits 122–126 are able to couple video data from the video processor to the memories. The previously described operations of the master control permit the Y address buffer/multiplex 118 to pass the Write memory Y address in parallel to the three memories 112-116. Similarly X address information is passed to these memories through the X address buffer multiplex 120. The three least significant bits of the X and Y Write memory addresses are sent in parallel to three parallel 8:1 scaler multiplexers 148, 150 and 152. The inputs of these scaler multiplexers are the eight digital values corresponding to the integrated color echo data from the 24 outputs of video processor 14. The values of the three least significant bits of the Write memory X and Y addresses are the control bits which select which of the eight echo data points pass through the scaler multiplexer, through the corresponding Read/Write multiplexer to be written into the memories. Remembering the operation of the master control hereinabove it will be realized that the time necessary to write the eight data values in the memories using the parameters discussed herein is approximately four microseconds so that the time space between acoustic pulses due to this factor is very short.

It will be appreciated that the preferred embodiment of the invention described herein is intended to be only an exemplary description of the principles of this invention. As discussed, modifications and changes in the described embodiment will occur to those skilled in the art, but such modifications and changes should be considered as being within the spirit and scope of the invention as defined by the dependent claims.

We claim:

1. An improved acoustic imaging system comprising:
   transducer means for producing two-dimensional acoustic imaging data from a planar section of an object which planar section is parallel to the effective transducer aperture,
   parallel processing means for receiving pulse-echo data from said transducer means and for simultaneously producing a plurality of image data related to a plurality of image locations, and
   means for providing a visual display from said image data.

2. An improved acoustic imaging system comprising:
   transducer means for producing two-dimensional acoustic imaging data from a non-planar surface of an object,
   parallel processing means for receiving pulse-echo data from said transducer means and for simultaneously producing a plurality of image data related to a plurality of image locations, and
   means for providing a visual display from said image data.

3. The improved acoustic imaging system defined in claim 1 or 2 wherein said transducer means comprises an array of a plurality of acoustic transducers, and further comprising:
   means for triggering predetermined ones of said transducers in said array to produce transmitted acoustic pulse signals and to receive acoustic pulse signals reflected from an object being viewed.

4. The improved acoustic imaging system defined in claim 3 further comprising:
   means for receiving said reflected acoustic pulse signals from said triggered transducers and for terminating receiving when said reflected acoustic pulse signals are determined to have been reflected from a predetermined maximum range.

5. The improved acoustic pulse-echo imaging system defined in claim 1 or 2 wherein said parallel processing means comprises a number of individual parallel processing channels for producing an equal number of individual image data corresponding to an equal number of image locations from each acoustic pulse signal transmitted and received by said array.

6. The improved acoustic imaging system defined in claim 5 wherein said transducer means comprises an array of a plurality of acoustic transducers, and further comprising:
   means for triggering predetermined ones of said transducers in said array for emitting acoustic pulse signals and receiving ones of said emitted acoustic pulse signals reflected from an object being viewed.

7. The improved acoustic imaging system defined in claim 6 further comprising:
   means for receiving said reflected acoustic pulse signals from said triggered transducers and for terminating receiving when reflected acoustic pulse signals are determined to have been reflected from a predetermined maximum range.

8. The improved acoustic imaging system defined in claim 1 or 2 further comprising:
   means for encoding said image data with varying color data, said color data being varied in relation to the distance from which said pulse-echo data forming said image data is received, whereby said color data provides for range discrimination when visually displayed.

9. The improved acoustic imaging system defined in claim 1 or 2 further comprising:
   weighting means for varying the amplitude of said image data in relation to the distance from which said pulse-echo data forming said image data is received, said weighted amplitude image data being applied to Z-axis driving means of said visual display.

10. An improved acoustic imaging system comprising:
    transducer means for producing three-dimensional acoustic imaging data,
    parallel processing means for receiving pulse-echo data from said transducer means and for simultaneously producing a plurality image data related to a plurality of image locations, and
    means for providing a visual display from said image data.

11. In an acoustic imaging system displaying at least two dimensions of an object being viewed including a transducer means for transmitting radiated energy signals and for receiving said radiated energy signals reflected from a target, means for producing image data from said received radiated energy signals and means for providing a visual display of said image data, the improvement comprising:
    means for encoding said image data with varying color data, said color data being varied in relation to the distance from which said received radiated energy signals are received, whereby said color data provides for range discrimination when visually displayed.

12. In an acoustic imaging system displaying at least two dimensions of an object being viewed including transducer means for transmitting acoustic signals and for receiving acoustic signals reflected from a target, means for producing image data from said received acoustic signals and means for providing a visual display of said image data, the improvement comprising:
    weighting means for varying the amplitude of said image data in relation to the distance from which said received acoustic signals forming said image data are received, said weighted amplitude image data being applied to Z-axis driving means of said visual display.

* * * * *

UNITED STATES PATENT AND TRADEMARK OFFICE
CERTIFICATE OF CORRECTION

PATENT NO. : 4,596,145
DATED : June 24, 1986
INVENTOR(S) : Stephen W. Smith, Olaf von Ramm It is certified that error appears in the above-identified patent and that said Letters Patent is hereby corrected as shown below:

In Claim 3, line 2, "claim 1 or 2" should read --claim 10 or 1 or 2--.

In Claim 5, line 2, "claim 1 or 2" should read -- claim 10 or 1 or 2 --.

In Claim 8, line 2, "claim 1 or 2" should read -- claim 10 or 1 or 2 --.

In Claim 9, line 2, "claim 1 or 2" should read -- claim 10 or 1 or 2 --.

Signed and Sealed this

Second Day of September 1986

[SEAL]

Attest:

DONALD J. QUIGG

Attesting Officer

Commissioner of Patents and Trademarks

(12) EX PARTE REEXAMINATION CERTIFICATE (7852nd)
United States Patent
Smith et al.

(10) Number: US 4,596,145 C1
(45) Certificate Issued: Nov. 9, 2010

(54) ACOUSTIC ORTHOSCOPIC IMAGING SYSTEM

(75) Inventors: Stephen W. Smith, Rockville, MD (US); Olaf T. von Ramm, Durham, NC (US)

(73) Assignee: Volumetrics Medical Imaging, LLC, Hillsborough, NC (US)

Reexamination Request:
No. 90/009,365, Dec. 17, 2008

Reexamination Certificate for:
Patent No.: 4,596,145
Issued: Jun. 24, 1986
Appl. No.: 06/533,956
Filed: Sep. 20, 1983

Certificate of Correction issued Sep. 2, 1986.

(51) Int. Cl.
*G01S 7/62* (2006.01)
*G01S 7/52* (2006.01)
*G01S 7/56* (2006.01)

(52) U.S. Cl. .......................... 73/626; 73/607
(58) Field of Classification Search .................. None
See application file for complete search history.

(56) References Cited

U.S. PATENT DOCUMENTS

| | | | |
|---|---|---|---|
| 3,918,025 A | 11/1975 | Koshikawa et al. | |
| 4,237,737 A | 12/1980 | Nitadori | |
| 4,596,145 A | 6/1986 | Smith et al. | |

FOREIGN PATENT DOCUMENTS

JP  55-52746  4/1980

OTHER PUBLICATIONS

"Acoustical Imaging", vol. 8 Ultrasonic Visualization and Characterization; A.F. Metherell (Exhibit C).
"Acoustic Imaging" Cameras, Microscopes, Phased Arrays, and Holographic Systems; Glen Wade (Exhibit D).
"Cardiovascular Imaging and Image Processing" Theory and Practice—1975 D.C. Harrison et al; vol. 72 (Exhibit F).
"An Improved Ultrasonic Imager Utilizing Spatial Compounding and Parallel Processing" D. P. Shattuck, Dept. of Biomedical Engineering Duke University; Jul. 9, 1982 (Exhibit I).
"U.S. Patent File History" includes: References, Jacket, Printed Patent, Specification, Oath, Drawings Figures, PTO/Applicant Correspondence & Original Pat.Appl. (Exhibit H).
"Plaintiff Volumetric Medical Imaging, LLC's Opening Brief on Claim Construction" Hearing Requested; U.S. Dist. Crt Middle District of North Carolina (Exhibit K).
"The Journal of the Acoustical Society of America"; vol. 75, No. 4, Apr. 1984 (Exhibit L).

*Primary Examiner*—Anjan K Deb

(57) ABSTRACT

An acoustic imaging system capable of producing C-mode images or orthoscopic projection images of a three-dimensional volume at significantly increased speeds of operation is described. For each acoustic pulse transmitted by a piezoelectric transducer array an electronic parallel processing system produces several unique image points whose locations in the image correspond to the Cartesian coordinates of the positions of receiving transducers. While range information is not directly displayed, range discrimination can be realized by means of an optional range dependent gain control or an optional color display in which range discrimination occurs through visual discrimination of differing hues.

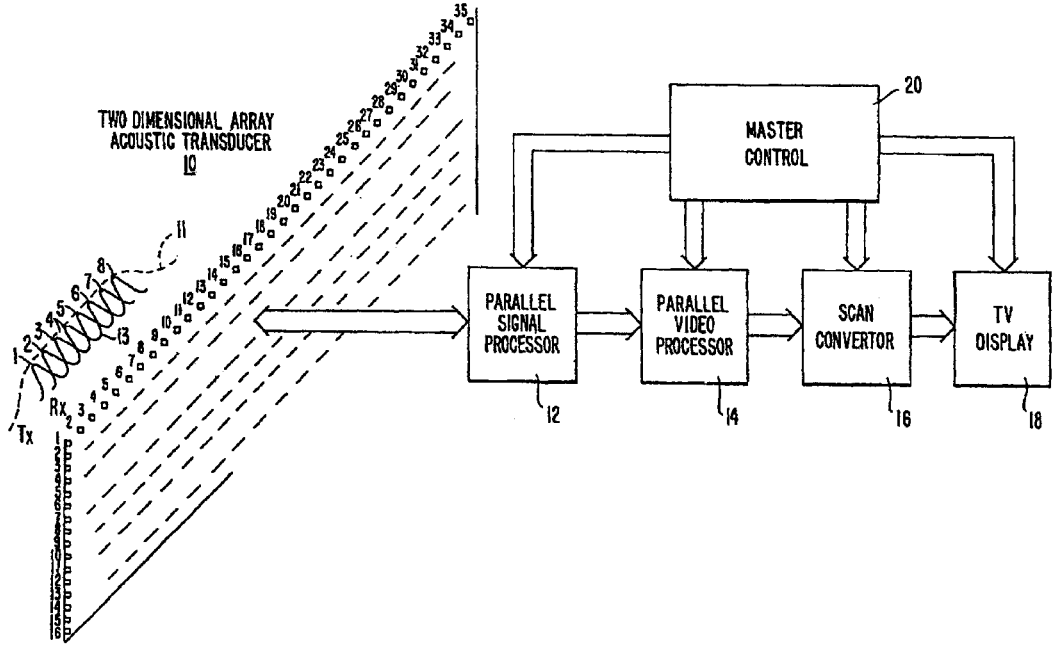

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-3, 5-6 and 10 is confirmed.

Claims 4, 7-9, 11 and 12 were not reexamined.

\* \* \* \* \*